United States Patent
Nakamura et al.

(10) Patent No.: US 6,459,177 B1
(45) Date of Patent: Oct. 1, 2002

(54) ELECTRIC ROTARY MACHINE HAVING A PLURALITY OF CONDUCTOR SEGMENTS AND METHOD OF MANUFACTURING THE SAME

(75) Inventors: Shigenobu Nakamura, Anjo; Mamoru Urushizaki, Chiryu; Mitsuru Katoh; Mitsuaki Taira, both of Anjo, all of (JP)

(73) Assignee: Denso Corporation, Kariya (JP)

(*) Notice: Subject to any disclaimer, the term of this patent is extended or adjusted under 35 U.S.C. 154(b) by 5 days.

(21) Appl. No.: 09/620,906

(22) Filed: Jul. 20, 2000

(30) Foreign Application Priority Data

Aug. 6, 1999 (JP) .............................. 11-224335

(51) Int. Cl.[7] .............................................. H02K 3/04
(52) U.S. Cl. ........................................ 310/42; 310/201
(58) Field of Search ................................ 310/179, 201, 310/208, 42, 254; 29/596–598

(56) References Cited

U.S. PATENT DOCUMENTS 6,147,432 A * 11/2000 Kusase et al. .............. 310/260
6,181,045 B1 * 1/2001 Umeda et al. .............. 310/201
6,201,332 B1 * 3/2001 Umeda et al. .............. 310/184
6,208,060 B1 * 3/2001 Kusase et al. .............. 310/254

FOREIGN PATENT DOCUMENTS

| EP | 57031357 | 2/1982 |
| EP | 60180675 | 9/1985 |
| EP | 63171132 | 7/1988 |
| EP | 0 923 187 | 6/1999 |
| GB | 1 312 735 | 4/1973 |
| JP | 57-031357 | 2/1982 |
| JP | 60-180675 | 9/1985 |
| JP | 63-171132 | 7/1988 |
| WO | WO92/06527 | 4/1992 |
| WO | WO98/54823 | 12/1998 |

* cited by examiner

Primary Examiner—Tran Nguyen
(74) Attorney, Agent, or Firm—Oliff & Berridge, PLC (57) ABSTRACT

The invention provides a rotary electric machine and method of manufacturing same, having a plurality of conductor segments inserted in a plurality of slots of a stator core. The conductor segments are welded together at adjacent connection ends by a welding arc so that the welding arc forms melted portions. The melted portions form vestiges that swell in a circumferential direction.

5 Claims, 7 Drawing Sheets

ELECTRIC ROTARY MACHINE HAVING A PLURALITY OF CONDUCTOR SEGMENTS AND METHOD OF MANUFACTURING THE SAME

CROSS REFERENCE TO RELATED APPLICATION

The present application is based on and claims priority from Japanese Patent Application Hei 11-224335 filed on Aug. 6, 1999, the contents of which are incorporated herein by reference.

BACKGROUND OF THE INVENTION

1. Field of the Invention

The present invention relates to a rotary electric machine and, particularly, a stator core of a rotary electric machine, which is useful to a vehicle AC generator.

2. Description of the Related Art

Recently, engine idling speed, car weight, and engine compartment space have been reduced. The engine idling speed has been reduced to improve environmental quality, the car weight has been reduced to improve fuel consumption, and the engine compartment space has been reduced to provide wider passenger compartment space. As a result, the size of an AC generator has been required to be smaller and more powerful.

WO/98/54823 proposes a vehicle AC generator which meets the requirement. Such a generator has a pair of conductor segments inserted into a plurality of slots, each connection end of which is connected to another to form a stator winding. This provides a stator winding of a high space factor and a low resistance.

In the above AC generator, each connection end of the conductor segments has a circumferentially and radially swelling vestige or lump, which congeals after each connection end was welded to form a stator winding. The vestige is formed because a melted portion tends to become spherical due to a surface tension. This reduces the distance between the circumferentially adjacent connection ends, which may cause insulation failure in the AC generator.

If the circumferential distance is so small that the distance is filled with resinous material. This prevents cooling air from passing between connection ends, resulting in reduction in the cooling performance. If the cooling air is interrupted, it is also difficult to remove electrolyte or foreign particles by air.

SUMMARY OF THE INVENTION

The present invention has been made to solve the above problems and to provide a rotary electric machine having a plurality of conductor segments which has improved insulation and cooling performances at the connection ends and a method of manufacturing the same.

In a method of manufacturing a rotary electric machine having a plurality of conductor segments according to the invention, each connection end is driven in the same circumferential direction until the connection end becomes solid. Accordingly, a vestige of the connection ends can be formed to swell in the same circumferential direction, and the circumferential size thereof can be made small. This increases the circumference distance between the circumferentially adjacent connection ends.

If the connection ends are not driven in the same circumferential direction, the melted portions become spherical due to the surface tension thereof at the connection ends to swell from the original periphery in opposite circumferential directions.

According to a feature of the invention, the welded portions are driven in the same circumferential direction so that the melted and swelling portions can move in the same circumferential direction. At this stage, the swelling amount is restrained by the surface tension, and the driven melted portion has more rectangular shape viewed in the axial direction. As a result, the circumferential size of the connecting ends having the congealed portions or vestiges is reduced. In other words, the circumferential distance between the adjacent connection ends can be increased. The melted portions are congealed while the connection ends are moved relative to a welding arc in a circumferential direction. The melted portions move to follow the welding arc as if the melted portions are driven or pulled by the welding arc. The melted portion can be formed by non-contact heating technology, which includes arc discharge, irradiation of a heat beam, such as a laser beam.

According to another feature of the invention, a magnetic field is applied to the welded portions while arc current is supplied thereto to drive the connection ends by an electromagnetic force.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator according to a preferred embodiment of the invention is described with reference to the appended drawings.

Figure 1:
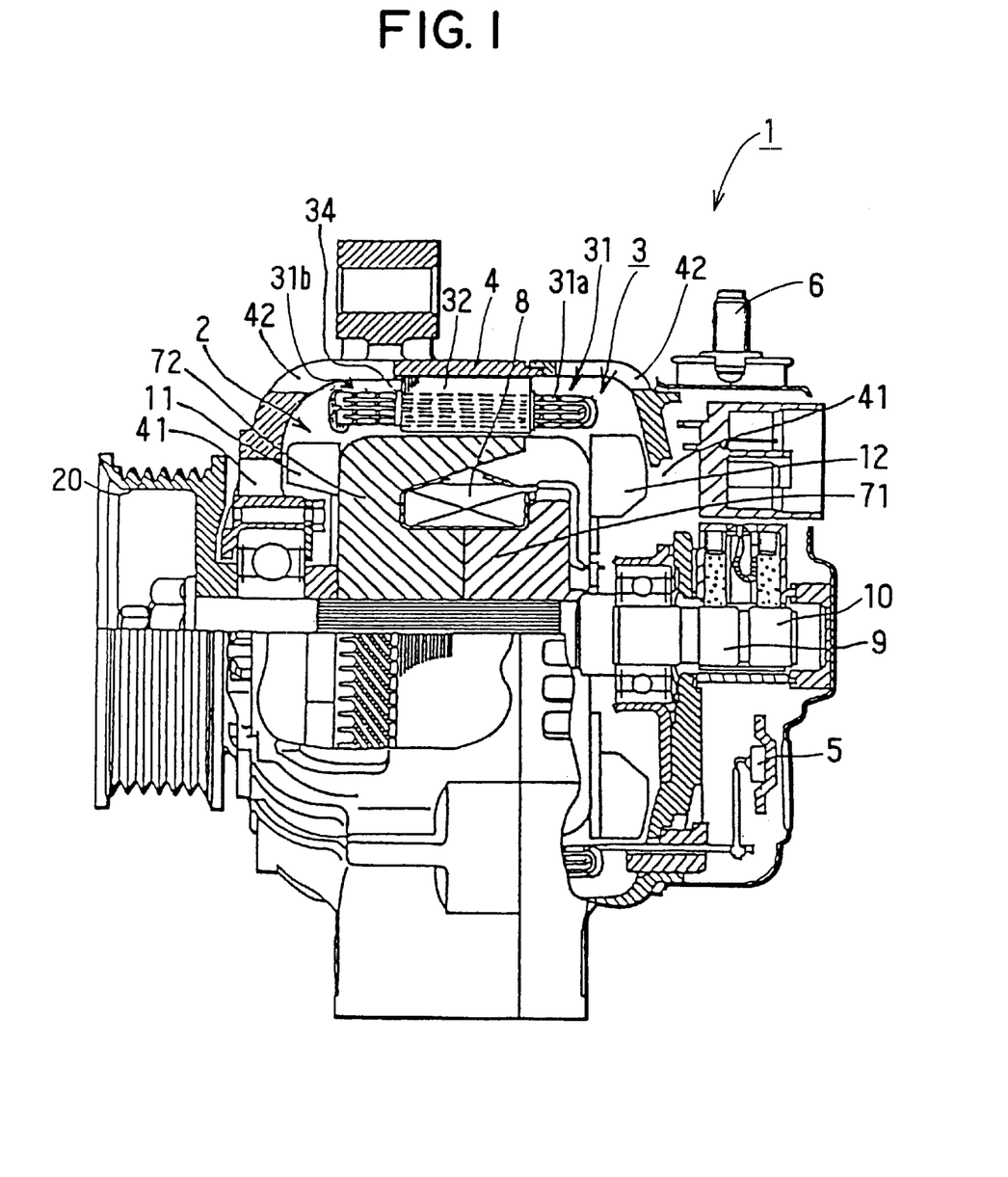
FIG. 1 is a cross-sectional side view illustrating a vehicle AC generator according to a preferred embodiment of the invention.

As shown in FIG. 1, vehicle AC generator 1 has pulley 20 which is driven by an engine. Pulley 20 is fixed to a shaft together with rotor 2.

Rotor 2 has a pair of pole cores 71 and 72 and field coil 8. Rotor 2 is rotatably supported by frame 4. The pair of pole cores 71 and 72 has cooling fans 11 and 12 respectively fixed to axially opposite ends thereof.

Stator 3 has stator winding 31 and stator core 32 comprised of laminated iron sheets. Stator core 32 has a plurality of slots in which stator winding 31 is disposed.

Sheet insulators 34 are respectively disposed to cover the inner walls of slots of stator core 32. Portions of stator winding 31 disposed in the plurality of slots are respectively insulated from stator core 32 by insulators 34 as well as the insulation coating thereof.

Figure 2:
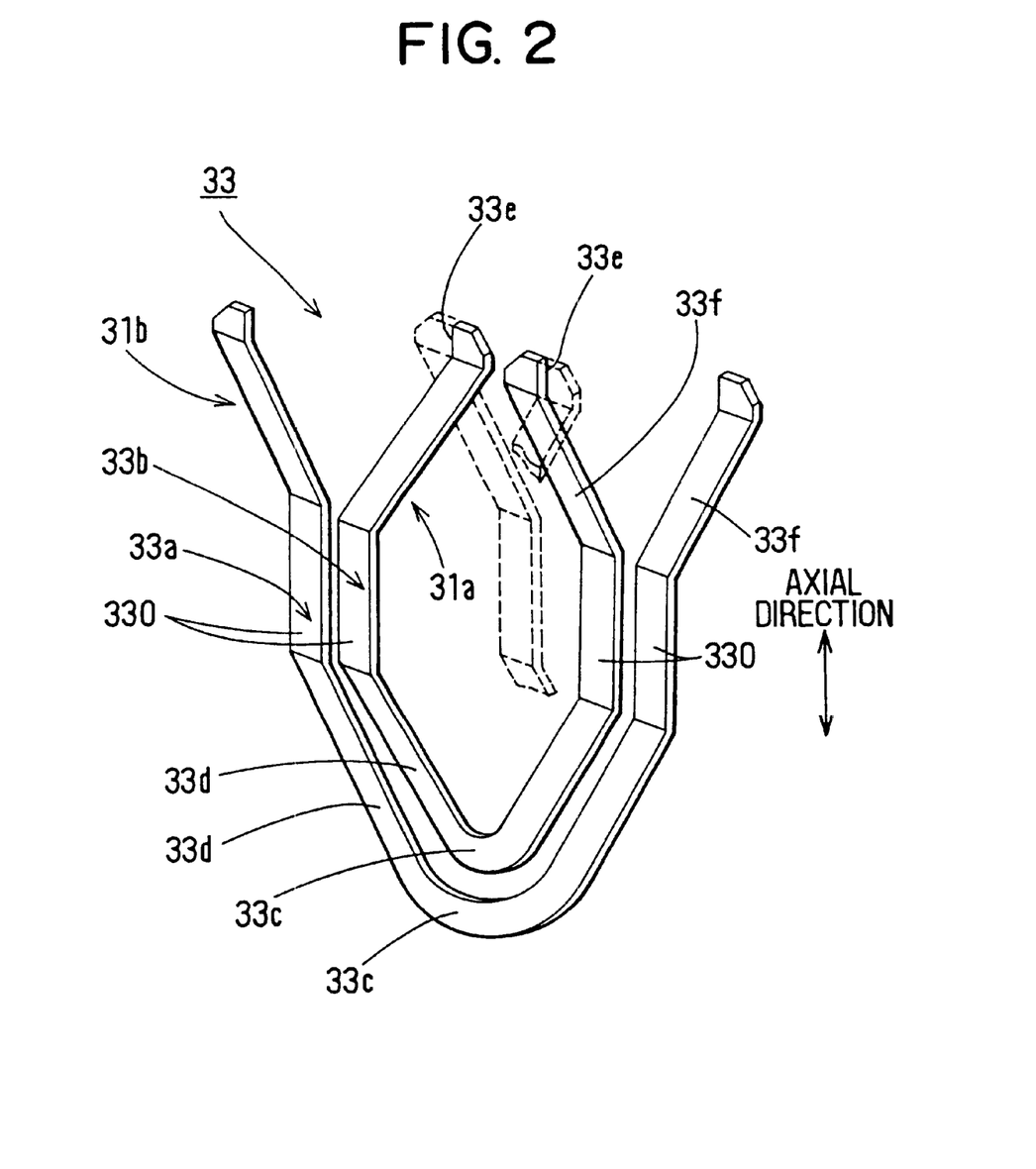
FIG. 2 is a perspective view of a conductor segment unit forming a stator winding of the AC generator according to the preferred embodiment.

As shown in FIG. 2, stator winding 31 is comprised of a plurality of conductor segment units 33, each of which is comprised of a pair of large- and small-turn U-shaped conductor segments 33a and 33b inserted into respective slots in a prescribed manner. Then, each connection end of conductor segments 33a and 33b is connected to another in a prescribed manner to form stator winding 31. One in-slot portion of each pair of U-shaped conductor segments 33a and 33b is accommodated in a slot different from the slot accommodating the other in-slot portion. Each large-turn segment 33a has a pair of in-slot portions 330 one of which is inserted into the deepest layer of one slot and the other of which is inserted into the shallowest layer of another slot, and each small-turn segment 33b has a pair of in-slot portions 330 one of which is inserted into the deeper middle layer of one slot and the other of which is inserted into the shallower middle layer of another slot. The connection ends of large and small-turn segments 33a and 33b are respectively connected to others to form stator winding 31.

Each of conductor segments 33a and 33b is further comprised of turn portion 33c, a pair of inclined portions 33d, a pair of connection ends 33e, and a pair of inclined portions 33f. The pair of inclined portions 33d is formed between turn portion 33c and the pair of in-slot portions 330. Turn portion 33c forms first coil end 31a together with adjacent inclined portions 33d.

The pair of inclined portions 33f is formed between the pair of connection ends 33e and the pair of in-slot portions 330.

Connection end 33e forms second coil end 31b together with adjacent inclined portions 33f.

As illustrated by solid and dotted lines in FIG. 2, two adjacent small-turn and large-turn conductor segments 33b and 33a are connected at connection ends 33e by a TiG (Tungsten Inert-Gas) welder.

Figure 3A:
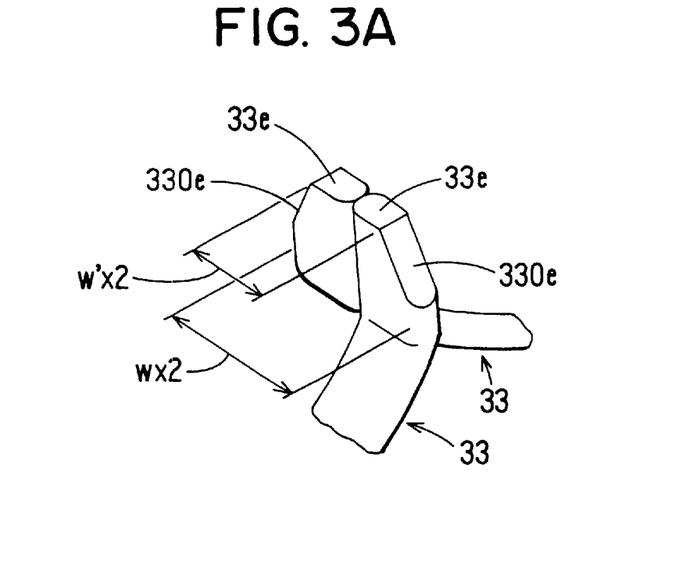
FIG. 3A is a perspective view illustrating connection ends of conductor segments before being welded.
Figure 3B:
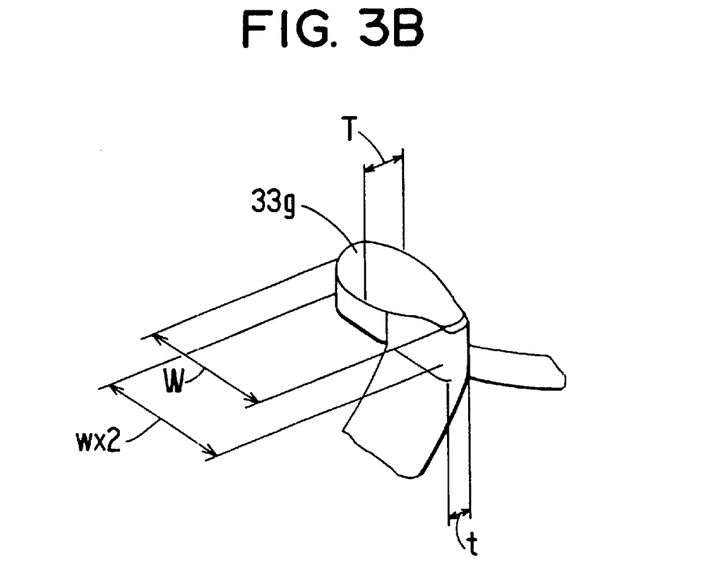
FIG. 3B is a perspective view of a welded portion of the conductor segments.

As illustrated in FIG. 3A, the sides of paired connection ends 33e opposite chamfered portions 330e are brought in contact with each other. Then, a tungsten electrode is set close thereto to generate an electric arc between the tungsten electrode and the paired connection ends 33e to melt a portion of paired connection ends 33e. After the melted portion congeals, the radially contacting paired connection ends 33e form welded portion (welded end) 33g of a dewdrop-like vestige, as illustrated in FIG. 3B.

Figure 5:
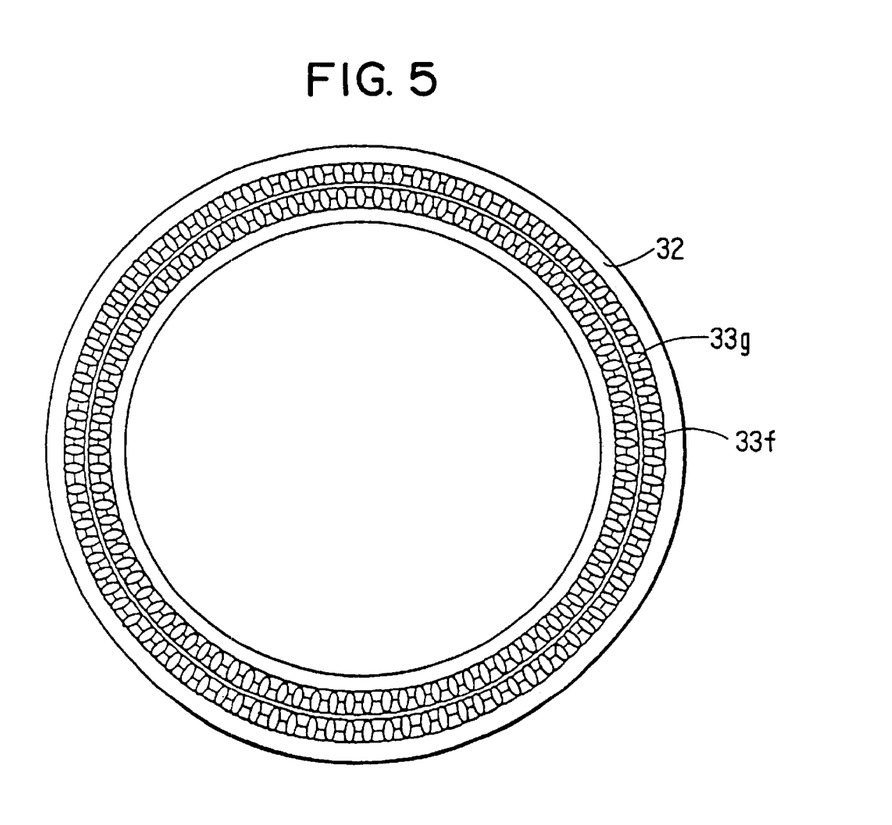
FIG. 5 is a plan view of the stator according to the preferred embodiment.

As a result, a pair of connection ends 33e extending through inclined portions 33f from in-slot portions 330 respectively disposed in the deepest layer and deeper middle layer of each slot of stator core 32 is welded, thereby forming welded portion 33g. In the same manner, a pair of connection ends 33e extending through inclined portions 33f from in-slot portions 330 respectively disposed in the shallowest layer and shallower middle layer of each slot of stator core 32 is welded, thereby forming welded portion 33g. Accordingly, welded portions 33g are aligned in double circles as illustrated in FIG. 5.

Figure 4:
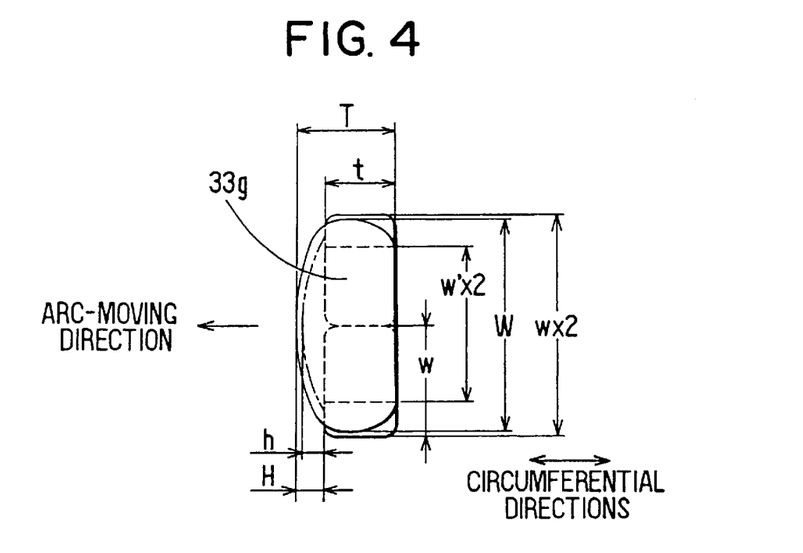
FIG. 4 illustrates a top view of the welded portion.

The circumferential thickness T of welded portion 33g, as shown in FIG. 4, becomes thicker than the thickness t of conductor segment 33a or 33b. The radial width W of welded portion 33g becomes wider than the width w'×2 of the conductor segments 33a and 33b except chamfered portions 330e. However, radial width W is shorter than the radial width w×2 of two conductor segments 33.

Figure 8:
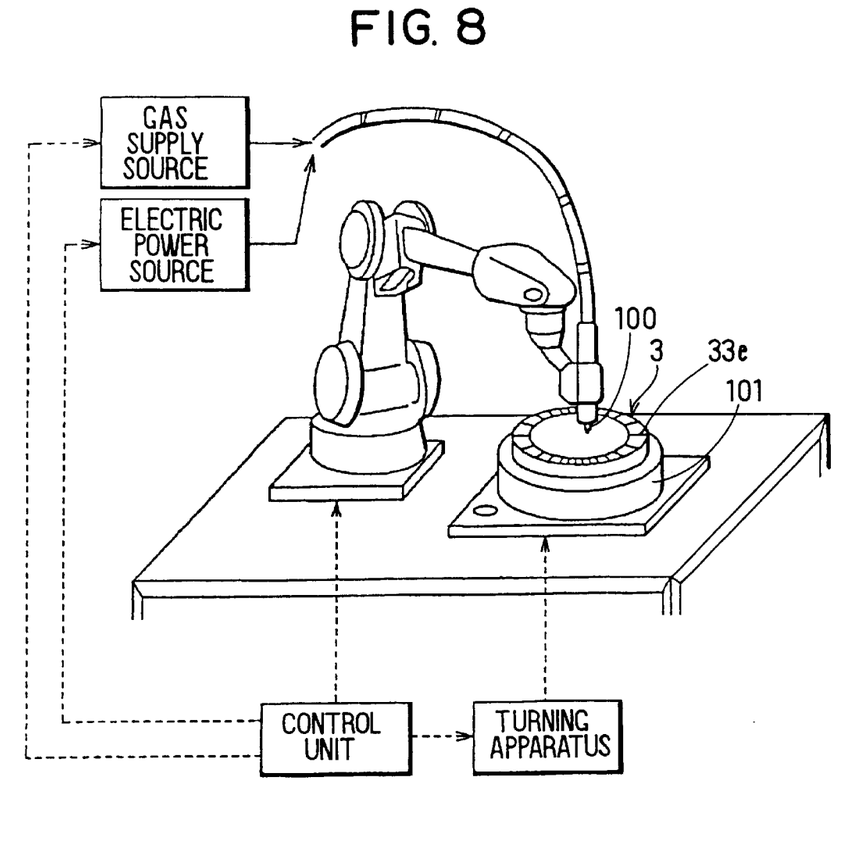
FIG. 8 is a schematic diagram illustrating a welder system.

Welded portion 33g swells only in one circumferential direction and not in the other direction. In order to swell welded portion 33g in one circumferential direction, the tungsten electrode is moved in the swelling direction of welded portion 33g while an electric arc is generated. As illustrated in FIG. 8, pedestal 101 for stator 3 is turned in one direction while an electric arc is generated between tungsten electrode 100 and conductor segment 33 to be welded.

Figure 6:
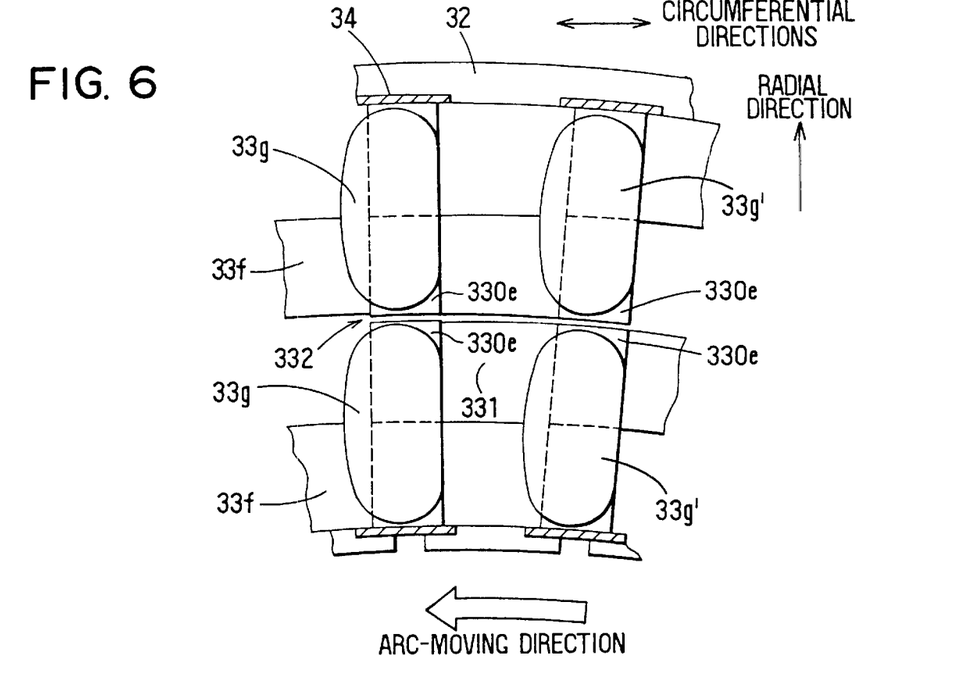
FIG. 6 is a fragmentary enlarged view of a portion shown in FIG. 5.
Figure 9:
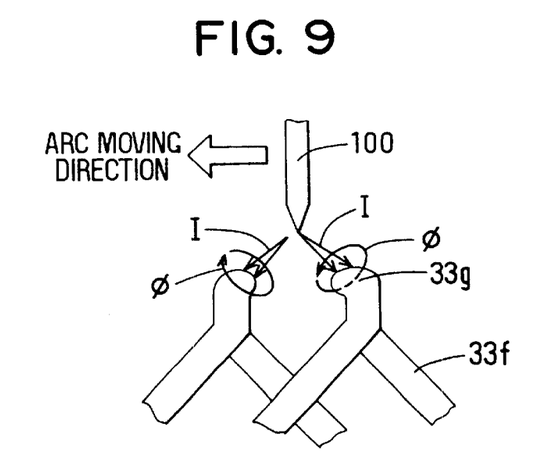
FIG. 9 is a diagram illustrating a step of arc welding according to the preferred embodiment.

The melted conductor, which is melted by an electric arc, has a highest flowability at the portion thereof in contact with the arc. As illustrated in FIG. 9, the electromagnetic pinch effect is caused due to magnetic field Φ that is generated in the right-hand-screw direction when the arc current I is supplied from electrode 100. Accordingly the melted portion having a high flowability is driven or drawn in the arc-moving direction. As illustrated in FIG. 6, welded portion 33g swells backward in the turning direction of stator 3. In FIG. 6, reference numeral 331 represents a circumferential gap between circumferentially adjacent welded portions 33g, and reference numeral 332 represents a radial gap between radially adjacent welded portions 33g.

One of circumferentially-swelling welded portion 33g formed in the above manner is shown in FIG. 4.

If the electric arc is generated while turning mechanism, shown in FIG. 8, turns stator 3 so that the surface in the arc moving direction can be always irradiated by the electric arc, the melted conductor is dragged in the same direction. As shown in FIG. 4, the maximum swelling height H of welded portion 33g is restrained by the surface tension to be lower than 2×h, where h is the height of the welded portion swelling in opposite circumferential directions due to the surface tension while stator 3 is not turned. The circumferential thickness T=t+H of welded portion from the rear surface of the arc-moving direction is smaller than the circumferential height t+2h of the welded portion formed while stator 3 is not turned. The radial length W also becomes larger than w'×2 and smaller than the radial. length w×2 of two conductor segments because of chamfered portion 330e.

In other words, connection ends 33e is moved relative to the tungsten electrode in one circumferential direction so that the vestige or welded portion 33g can be formed one of the circumferential directions of connection end. Welded portion 33g is shaped into letter D if viewed from the axially upper position. The axial cross-section of the same is shaped like letter q.

Figure 7:
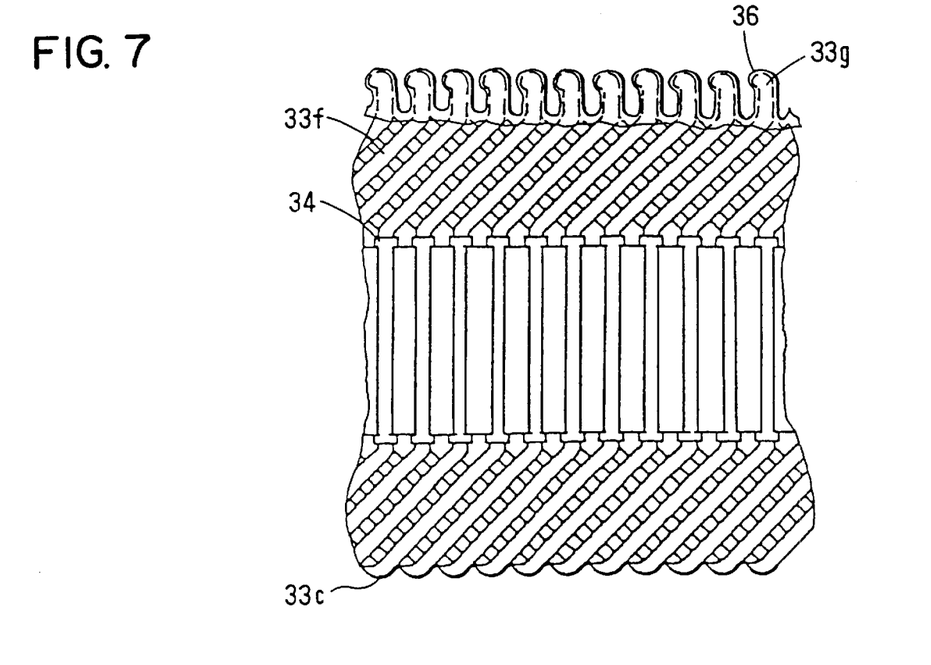
FIG. 7 is a fragmentary side view of the stator according to the preferred embodiment viewed from the radially inner position.

Thereafter, welded portion 33g is covered by insulation resin 36, as shown in FIG. 7, so that gaps can be formed between adjacent welded portions 33g to pass cooling air therethrough.

Pulley 20 of vehicle AC generator 1 is driven by an engine, and rotor 2 fixed to pulley 20 is rotated. At this stage, field coil 8 of rotor 2 is supplied with field current through slip rings 9 and 10 so that N and S poles are formed in pole cores 71, 72. This causes stator winding 31 to generate AC voltage, and a prescribed amount of DC current is supplied from output terminals 6 of rectifier 5. Cooling fans 11 and 12 take cooling air inside from windows 41 formed at axial ends of frame 4 and discharge it outside from windows 42 formed at radially outer portions of frame 4.

When welded portion 33e is moved relative to electric arc, the welded portion swells in one circumferential direction so that the circumferential height H thereof becomes smaller than double the circumferential height h, due to the surface tension, formed if welded portion 33e was not moved relative to electric arc. As a result, the circumferential gap 331 between circumferentially adjacent welded portions 33g and 33g can be increased as compared with the circumferential gap between circumferentially adjacent welded portions 33g' and, 33g' as shown in FIG. 6 without relative movement of connection portion 33e. This improves insulation performance. As the circumferential gap increases, larger amount of cooling air can be supplied to improve cooling performance. Further, the above structure can prevent foreign particles from remaining between the gaps, thereby preventing electrical failure of the vehicle AC generator.

(Variation)

Figure 10:
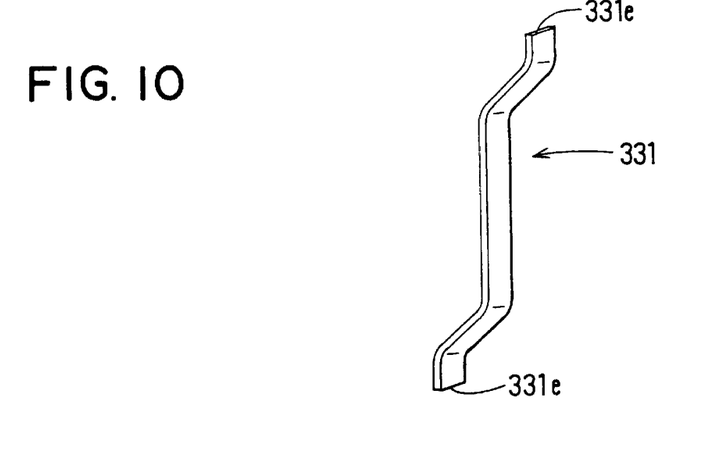
FIG. 10 is a perspective view illustrating a variation of the conductor segment according to the preferred embodiment.

Instead of U-shaped conductor segment unit 33, conductor segments 331 without the turn portion as illustrated in FIG. 10 can be used. In this case, opposite ends 331e are welded. This also provides the same effect as the preceding embodiment.

Four conductor segments per slot and two circularly aligned welded portions are formed. However, the number of conductor segments and circular welded portions can be changed to match the generator output performance.

Figure 11:
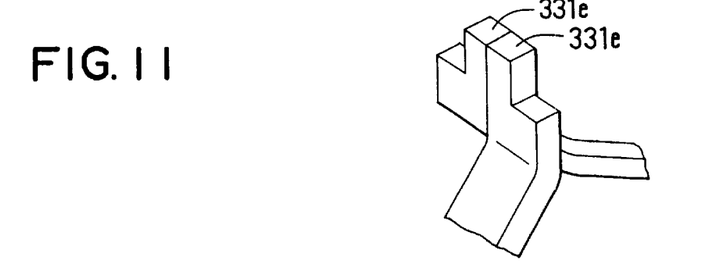
FIG. 11 is a perspective view illustrating a variation of the connection ends of the conductor segments according to the preferred embodiment.

Connection end 33e has chamfered portion 330e. However, the radial length of connection end 331e can be shortened as shown in FIG. 11. This further improves insulation performance between the adjacent welded portions.

The cross-sectional shape of conductor segment 33 can be round, elliptic, or polygonal.

TIG welder can be substituted by any non-contact type welder such as a plasma welder, a MIG (metal inert-gas) welder, a laser welder or an electric beam welder.

In order to swell the melted portion in one circumferential direction, welded portion 33g is inclined so that the melted portion can swell by its weight. For example, the swelling circumferential direction of welded portion 33g is made agree with downward direction with the other circumferential direction being upward.

Instead of the turning for swelling the melted portion in one circumferential direction, air blow or other blowing pressure can be applied to the melted portion.

Figure 12:
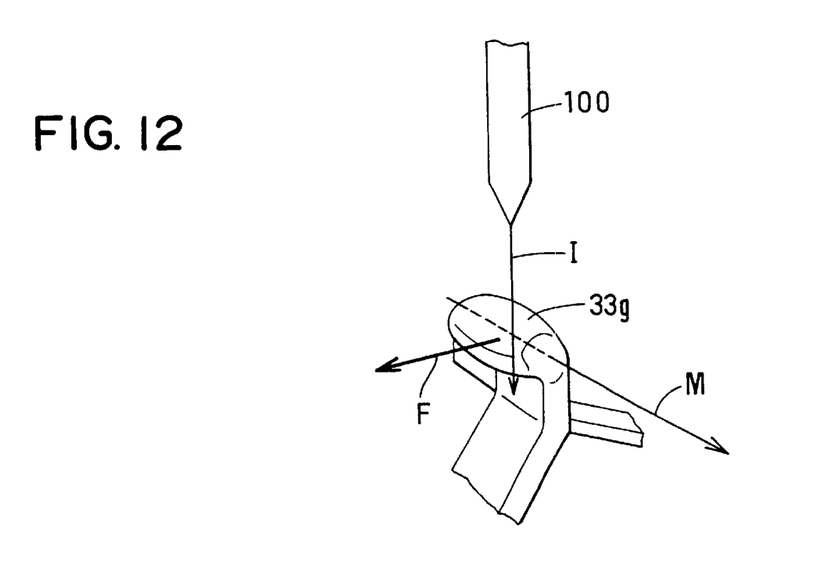
FIG. 12 is a perspective view illustrating a variation of a step of arc welding according to the preferred embodiment.

Instead of the turning for swelling the melted portion in one circumferential direction, a magnetic field can be applied as indicated by M in FIG. 12.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary electric machine comprising:
   a stator core having a plurality of slots; and
   a plurality of conductor segments inserted into each said plurality of slots, each of said plurality of conductor segments having connection ends being welded to other connection ends and being disposed at one end of a stator core; wherein
   each said connection end has a vestige of being welded which has a greater amount of swell in a first circumferential direction than the amount of swell in a second circumferential direction.

2. The rotary electric machine having a plurality of conductor segments as claimed in claim 1, wherein
   each said conductor segment has a rectangular cross-section having radial and circumferential sides, and
   said vestige has shorter radial sides than said radial sides of each said conductor segment adjacent to said vestige.

3. The rotary electric machine as claimed in claim 1, wherein the vestige swells substantially only in the first circumferential direction.

4. The rotary electric machine as claimed in claim 1, wherein the vestige is formed by an electric arc that moves in the first circumferential direction.

5. The rotary electric machine as claimed in claim 4, wherein the vestige has a maximum swelling height (H) that is lower than twice as high as a swelling height (h) formed due to surface tension when said electric arc does not move.

* * * * *